United States Patent
Titus et al.

(10) Patent No.: US 8,719,077 B2
(45) Date of Patent: May 6, 2014

(54) REAL WORLD AND VIRTUAL WORLD CROSS-PROMOTION

(75) Inventors: Tobin Titus, Redmond, WA (US); Ernie Booth, Redmond, WA (US); Erik Porter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 889 days.

(21) Appl. No.: 12/022,122

(22) Filed: Jan. 29, 2008

(65) Prior Publication Data

US 2009/0192891 A1  Jul. 30, 2009

(51) Int. Cl.
*G06Q 40/00* (2012.01)
*G06Q 30/02* (2012.01)

(52) U.S. Cl.
CPC .................................... *G06Q 30/02* (2013.01)
USPC ............ 705/14; 705/27; 705/302; 705/14.16; 705/14.41; 715/757; 715/706; 715/751; 715/769; 463/32; 379/114; 345/419

(58) Field of Classification Search
USPC ............... 705/14, 27, 302, 14.16, 14.41, 751; 705/26.43; 715/757, 706, 769; 463/32, 42; 379/114; 345/419; 709/204; 707/655
See application file for complete search history.

(56) References Cited

U.S. PATENT DOCUMENTS

| | | | |
|---|---|---|---|
| 5,740,388 A | 4/1998 | Hunt | |
| 5,880,731 A | 3/1999 | Liles et al. | |
| 5,977,968 A | 11/1999 | Le Blanc | |
| 6,036,601 A | 3/2000 | Heckel | |
| 6,236,978 B1 | 5/2001 | Tuzhilin | |
| 6,385,592 B1 | 5/2002 | Angles et al. | |
| 6,476,830 B1 | 11/2002 | Farmer et al. | |
| 6,775,581 B2 | 8/2004 | Landers et al. | |
| 6,910,186 B2 | 6/2005 | Kim | |
| 6,954,728 B1 * | 10/2005 | Kusumoto et al. | 705/14.4 |
| 7,054,928 B2 | 5/2006 | Segan et al. | |
| 7,101,284 B2 | 9/2006 | Kake et al. | |
| 7,168,084 B1 * | 1/2007 | Hendricks et al. | 725/42 |
| 7,212,985 B2 | 5/2007 | Sciuk | |
| 7,249,139 B2 | 7/2007 | Chuah et al. | |

(Continued)

FOREIGN PATENT DOCUMENTS

JP           14023917 A     1/2002
KR   1020010105429 A    11/2001

(Continued)

OTHER PUBLICATIONS

U.S. Official Action dated Jul. 21, 2011 in U.S. Appl. No. 11/868,967.
U.S. Official Action dated Jul. 14, 2011 in U.S. Appl. No. 11/868,972.
U.S. Official Action dated Jul. 21, 2011 in U.S. Appl. No. 11/965,732.
"Second Life: Migration to Virtual Worlds and the Use of Time", Oct. 19, 2007, pp. 4.

(Continued)

*Primary Examiner* — Tien Nguyen

(74) *Attorney, Agent, or Firm* — Dan Choi; Carole Boelitz; Micky Minhas

(57) ABSTRACT

Technologies are described herein for cross promoting real objects in a real world and virtual objects in a virtual world. A redemption code is received from a first participant in the virtual world. A virtual object corresponding to the redemption code is provided to the first participant. A request for information regarding the real object is received from a second participant of the virtual world and via the virtual object. Upon receiving the request via the virtual object, information regarding the real object is provided to the second participant and via the virtual object.

13 Claims, 6 Drawing Sheets

(56) References Cited

U.S. PATENT DOCUMENTS

| | | |
|---|---|---|
| 7,257,552 B1 | 8/2007 | Franco |
| 7,421,660 B2 | 9/2008 | Charnock et al. |
| 7,484,176 B2 | 1/2009 | Blattner et al. |
| 7,568,004 B2 | 7/2009 | Gottfried |
| 7,792,801 B2* | 9/2010 | Hamilton et al. ............ 707/655 |
| 7,797,168 B2 | 9/2010 | Kusumoto et al. |
| 7,865,566 B2* | 1/2011 | Ashtekar et al. ............ 709/207 |
| 7,996,264 B2 | 8/2011 | Kusumoto et al. |
| 8,348,762 B2 | 1/2013 | Willis et al. |
| 8,417,535 B2 | 4/2013 | Kusumoto et al. |
| 8,527,334 B2* | 9/2013 | Porter et al. ............ 705/14.16 |
| 8,601,379 B2* | 12/2013 | Marks et al. .............. 715/757 |
| 2002/0002509 A1 | 1/2002 | Wagorn et al. |
| 2002/0007314 A1 | 1/2002 | Maruyama |
| 2002/0036654 A1 | 3/2002 | Evans et al. |
| 2002/0040332 A1* | 4/2002 | Maari et al. .................... 705/27 |
| 2002/0052881 A1 | 5/2002 | Player |
| 2002/0052913 A1 | 5/2002 | Yamada et al. |
| 2002/0065746 A1 | 5/2002 | Lewis |
| 2004/0029626 A1 | 2/2004 | Annunziata |
| 2004/0093266 A1* | 5/2004 | Dohring ......................... 705/14 |
| 2004/0148221 A1 | 7/2004 | Chu |
| 2004/0153366 A1 | 8/2004 | Olson et al. |
| 2004/0248649 A1 | 12/2004 | Arai et al. |
| 2004/0250210 A1 | 12/2004 | Huang et al. |
| 2005/0060259 A1 | 3/2005 | Holmes et al. |
| 2005/0149391 A1* | 7/2005 | O'Shea et al. ................. 705/14 |
| 2005/0216346 A1* | 9/2005 | Kusumoto et al. ............ 705/14 |
| 2005/0223328 A1 | 10/2005 | Ashtekar et al. |
| 2005/0251553 A1 | 11/2005 | Gottfried |
| 2006/0026064 A1 | 2/2006 | Collins |
| 2006/0100018 A1 | 5/2006 | Ganz |
| 2006/0111979 A1 | 5/2006 | Chu |
| 2006/0130095 A1 | 6/2006 | Willis et al. |
| 2006/0155597 A1 | 7/2006 | Gleason |
| 2006/0178975 A1 | 8/2006 | Jung et al. |
| 2006/0212561 A1 | 9/2006 | Feng |
| 2006/0293958 A1 | 12/2006 | Koenig |
| 2007/0035548 A1 | 2/2007 | Jung et al. |
| 2007/0061333 A1 | 3/2007 | Ramer et al. |
| 2007/0073582 A1 | 3/2007 | Jung et al. |
| 2007/0087799 A1 | 4/2007 | Van Luchene |
| 2007/0121843 A1 | 5/2007 | Atazky et al. |
| 2007/0168863 A1* | 7/2007 | Blattner et al. ............... 715/706 |
| 2007/0179867 A1 | 8/2007 | Glazer et al. |
| 2007/0200846 A1 | 8/2007 | Nakamura |
| 2007/0203817 A1* | 8/2007 | Jung et al. ....................... 705/35 |
| 2007/0218987 A1 | 9/2007 | Van Luchene et al. |
| 2007/0243936 A1 | 10/2007 | Binenstock et al. |
| 2007/0244750 A1 | 10/2007 | Grannan et al. |
| 2007/0294096 A1 | 12/2007 | Randall et al. |
| 2007/0294171 A1* | 12/2007 | Sprunk ........................... 705/50 |
| 2008/0059304 A1 | 3/2008 | Kimsey |
| 2008/0163055 A1* | 7/2008 | Ganz et al. .................... 715/706 |
| 2008/0163379 A1 | 7/2008 | Robinson et al. |
| 2008/0204450 A1 | 8/2008 | Dawson et al. |
| 2008/0208684 A1* | 8/2008 | Hamilton et al. ............... 705/14 |
| 2008/0215975 A1 | 9/2008 | Harrison et al. |
| 2008/0254419 A1 | 10/2008 | Cohen |
| 2008/0254426 A1 | 10/2008 | Cohen |
| 2008/0262908 A1 | 10/2008 | Broady et al. |
| 2008/0263446 A1 | 10/2008 | Altberg et al. |
| 2009/0019541 A1 | 1/2009 | Fontijn |
| 2009/0029769 A1 | 1/2009 | Muller |
| 2009/0089310 A1 | 4/2009 | Lara et al. |
| 2009/0091565 A1 | 4/2009 | Booth et al. |
| 2009/0094106 A1 | 4/2009 | Porter et al. |
| 2009/0098939 A1 | 4/2009 | Hamilton et al. |
| 2009/0119173 A1 | 5/2009 | Parsons et al. |
| 2009/0132361 A1 | 5/2009 | Titus et al. |
| 2009/0167766 A1 | 7/2009 | Porter et al. |
| 2009/0210301 A1 | 8/2009 | Porter et al. |
| 2010/0058183 A1 | 3/2010 | Hamilton et al. |

FOREIGN PATENT DOCUMENTS

| | | |
|---|---|---|
| KR | 100614899 B1 | 8/2006 |
| WO | WO0124083 A2 | 4/2001 |
| WO | WO 2004/053799 | 6/2004 |

OTHER PUBLICATIONS

Keeves, "Real or virtual? Play the intersection, and build communities!", Mar. 24, 2007, IBC Solutions—Future Thinking, pp. 1.

Terdiman, "Meet the Metaverse, Your New Digital Home", 1995-2007 CNET Networks, pp. 1-2.

Dibbell, "The Life of the Chinese Gold Farmer", Jun. 17, 2007, New York Times Company, pp. 1-9.

"The IBM Innovate Quick Internal Metaverse Project", May 2007, pp. 1-8.

U.S. Official Action dated Feb. 3, 2011 in U.S. Appl. No. 11/868,967.

U.S. Official Action dated Jan. 24, 2011 in U.S. Appl. No. 11/943,610.

U.S. Official Action dated Jan. 25, 2011 in U.S. Appl. No. 11/965,732.

U.S. Official Action dated Dec. 8, 2010 in U.S. Appl. No. 12/031,683.

Terdiman, "Meet the Metaverse, Your New Digital Home", Apr. 16, 2007, CNET Networks, pp. 1-2.

U.S. Official Action dated Aug. 9, 2011 in U.S. Appl. No. 12/031,683.

U.S. Official Action dated Aug. 31, 2012 in U.S. Appl. No. 11/965,732.

"Replace" and "Transaction" Merriam-Webster, Incorporation, Merriam-Webster's Collegiate Dictionary, tenth Edition (1998) pp. 992, 1252.

U.S. Official Action dated May 10, 2013 in U.S. Appl. No. 11/943,610.

U.S. Notice of Allowance dated Apr. 26, 2013 in U.S. Appl. No. 11/965,732.

International Search Report dated Jun. 17, 2009 in International Application No. PCT/US2008/087879.

Benkoil, "Will Google's Virtual World Plans Change Virtual Ad Economics?", Oct. 16, 2007, JackMyers.com, pp. 1-2.

Poppe, S., "What's the idea?", Sep. 28, 2007, retrieved Oct. 25, 2007 at http://spoppe.livejournal.com/tag/advertising, pp. 1-13.

Tarumi, et al., "Communication through Virtual Active Objects Overlaid onto the Real World", Sep. 2000, Proceedings of the Third International Conference on Collaborative Virtual Environments (CVE 2000), ACM, pp. 155-164.

Whang, et al., "Lifestyles of Virtual World Residents, Living in the on-line game, 'Lineage'", Dec. 3-5, 2003, Proceedings of 2003 International Conference on Cyberworlds (CW'03), pp. 18-25.

Woywood, T., "Advertising, Branding & Marketing in Social Virtual Worlds", 2006, www.newton2l,com, pp. 39-42.

Vedrashko, I., "Advertising in Computer Games", Sep. 2006, www.GamesBrandsPlay.com, 80 pages.

"Branding your Business with Avatars", retrieved Oct. 25, 2007, at http://www.pigandpanda.com/ebay-education/avatars.htm, Pig and Panda, pp. 1-3.

"The Buzz on . . . MMOGs and in-game advertising", retrieved Oct. 25, 2007, at www.iabuk.net/media/images/Thebuzzontheinternetsimpactongaming_1101.doc, Internet Advertising Bureau, pp. 1-13.

"Is this avatar attribute query issue I am thinking of valid?", Dec. 6, 2006, retrieved Oct. 25, 2007, at http://forums.activeworlds.com/showthread.php?p=39288, pp. 1-3.

"Marketing to Avatars", retrieved Oct. 25, 2007 at http://www.virtuallinks.net/?p=8, pp. 1-4.

U.S. Official Action dated Aug. 5, 2010 in U.S. Appl. No. 11/943,610.

U.S. Official Action dated Oct. 8, 2010 in U.S. Appl. No. 11/868,972.

U.S. Notice of Allowance dated Aug. 7, 2013 in U.S. Appl. No. 11/868,967.

U.S. Notice of Allowance dated Aug. 2, 2013 in U.S. Appl. No. 11/868,972.

U.S. Official Action dated Dec. 6, 2013 in U.S. Appl. No. 11/943,610.

\* cited by examiner

REAL WORLD AND VIRTUAL WORLD CROSS-PROMOTION

BACKGROUND

In recent years, massively multiplayer online ("MMO") computer applications, such as massively multiplayer role-playing games ("MMORPGs"), have become extremely popular not only with serious gamers, but also with casual gamers and other Internet users. One example of a MMO computer application enables a participant to create and develop a fictional character in a virtual world. The fictional character is usually associated with an avatar or some other visual representation that enables other participants to recognize the particular fictional character. A given participant may develop, among other things, a storyline, a reputation, and attributes of her fictional character by interacting in the virtual world via the fictional character. Other examples of MMO computer applications may not involve the creation of a virtual world representation of the participant.

The virtual world typically includes an environment with a variety of virtual locations containing a variety of virtual objects. In some cases, the virtual locations and the virtual objects mimic realistic locations and objects, while in other cases, the virtual locations and virtual objects are fanciful creations. MMO computer applications generally permit the fictional character to travel across the virtual locations and interact with the virtual objects and other fictional characters.

Advertising in the modern age has proven to be increasingly challenging. In particular, conventional advertising techniques have become less effective especially in recent times. Consumers are now provided with substantially more entertainment options than just a few years ago, thereby reducing the number of consumers that are exposed to a given advertisement. Further, new technologies, such as portable music players, satellite radio, and digital video recorders ("DVRs"), have allowed the users to avoid or skip conventional advertisements entirely.

As advertisers try to find ways to reach more consumers, one advertising medium that has become more attractive are virtual worlds, like MMO computer applications. The number of participants in MMO computer applications has steadily increased in recent times, and this trend shows little, if any, signs of reversing. Further, MMO computer applications provide a single entertainment destination for many Internet users and gamers, thereby enabling advertisers to reach a larger number of consumers through a single advertising medium. As computer and Internet technologies continue to improve to provide more and better ways to include real-world advertisements within the virtual world, MMO computer applications will continue to grow as a significant advertising medium.

It is with respect to these considerations and others that the disclosure made herein is presented.

SUMMARY

Technologies are described herein for cross-promoting real objects in a real world and virtual objects in a virtual world. In particular, through the utilization of the technologies and concepts presented herein, real objects in the real world are utilized to promote virtual objects in the virtual world. For example, upon purchasing the real object, a virtual world participant may receive a redemption code. In its simplest form, the redemption code may be printed on paper. The redemption code may also be stored in a bar code, a magnetic strip, or other suitable technology. The redemption code may be entered in a redemption code interface in the virtual world to receive a corresponding virtual object. Likewise, virtual objects in the virtual world are utilized to promote real objects in the real world. For example, interacting with the virtual object may provide information regarding the real object. The virtual object may also provide a purchasing interface for purchasing the real object.

According to one aspect presented herein, a computer program is provided for cross-promoting real objects in a real world and virtual objects in a virtual world. The computer program receives, from a first participant of the virtual world, a redemption code. The computer program provides, to the first participant, a virtual object corresponding to the redemption code. Upon receiving the virtual object, the first participant may allow other participants, such as a second participant, of the virtual world to view and interact with the virtual object. The computer program receives, from the second participant and via the virtual object, a request for information regarding a real object. Upon receiving the request, the computer program provides, to the second participant and via the virtual object, the information regarding the real object.

It should be appreciated that although the features presented herein are described in the context of a MMO computer application, these features may be utilized with any type of virtual world or environment including, but not limited to, other types of games as well as online social communities. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
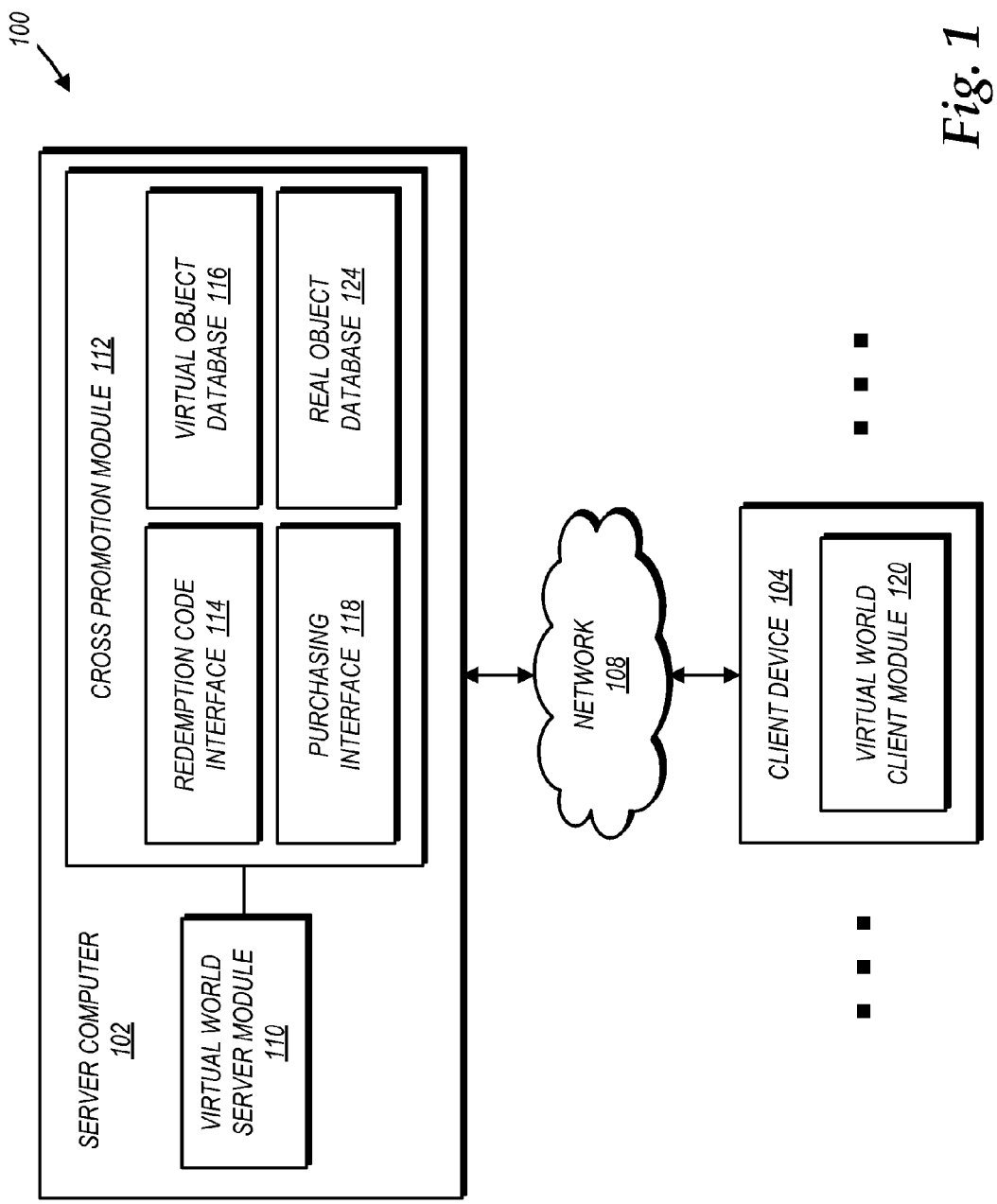
FIG. 1 is a network architecture diagram showing aspects of a network architecture capable of implementing a virtual world.

The following detailed description is directed to technologies for real world and virtual world cross promotion.

Through the utilization of the technologies and concepts presented herein, a first virtual world participant (hereinafter referred to as a first participant) may purchase a real object in the real world. Upon purchasing the real object, the first participant may receive a redemption code, which may be used to retrieve a corresponding virtual object in the virtual world. The redemption code is essentially a way to promote the virtual object utilizing the real object. Upon retrieving the virtual object, the first participant may allow other virtual participants, such as a second virtual world participant (hereinafter referred to as a second participant) to view and interact with the virtual object. For example, the second participant may interact with the virtual object to receive information regarding the real object as well as to purchase the real object. The information provided via the virtual object is essentially a way to promote the real object utilizing the virtual object. The information may also include a coupon that can be applied to the purchase of the real object.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As used herein, the term virtual world refers to a computer-implemented environment, which may include simulated, lifelike environments as well as fanciful, non-existing environments. Exemplary virtual worlds may include any massively multiplayer online ("MMO") computer application including, but not limited to, massively multiplayer online role-playing games ("MMORPGs"), virtual social communities, and virtual reality computer applications. In one embodiment, the MMO computer application simulates a real world environment. For example, the virtual world may be defined by a number of rules, such as the presence of gravity or the lack thereof. In other embodiments, the MMO computer application includes a fanciful environment that does not simulate a real world environment.

The virtual world is generally inhabited by avatars, which are virtual or symbolic representations of real world participants (hereinafter referred to as participants). As such, each avatar is typically associated with and controlled by a particular participant. Avatars may include two-dimensional and/or three-dimensional images. Through the virtual world, the avatars may interact with other avatars, as well as with virtual objects. Virtual objects may include virtual representations of real world objects, such as houses, cars, billboards, clothes, and soda cans, as well as fanciful creations, such as a teleportation machine or a flying car. According to exemplary embodiments, one or more virtual objects and one or more avatars in the virtual world are capable of providing an advertisement. The avatars and the virtual objects utilized in the virtual world may or may not be animated images.

As used herein, the term "cross promotion" refers generally to the utilization of real world objects to promote virtual objects as well as the utilization of virtual objects to promote real world objects. In an illustrative example, a first participant may purchase a real plasma television or other real object from a major department store or an online retailer. Upon purchasing the real plasma television, the first participant may receive a redemption code. The redemption code may be found, for example, inside the box containing the television or on a receipt. In its simplest form, the redemption code may be printed on paper. The redemption code may also be stored in any suitable technology including, but not limited to, a bar code, a magnetic strip, or other suitable technology. The virtual world may provide a redemption code interface with which the first participant may enter the redemption code. Upon sending the redemption code, the first participant may receive a virtual plasma television or other virtual object. The first participant, via a corresponding avatar, may view and utilize the virtual object. In one embodiment, the virtual object corresponds to the real object. For example, the virtual plasma television may be a virtual replica of the real plasma television. In another embodiment, the virtual object is unrelated to the real object.

Once the virtual object is in the virtual world, the first participant may allow other participants to view and interact with the virtual object. In the illustrative example, a second virtual world participant, via a corresponding avatar, may view and interact with the virtual plasma television inside the virtual home of the first participant. Upon interacting with the virtual plasma television, the second participant may be provided with information regarding the real plasma television. The information provided may include advertising information, purchasing information, and the like. In one embodiment, the information further includes a coupon that can be applied to the purchase of the real plasma television. The second participant may also be provided with a purchasing interface, such as a virtual storefront, with which the second participant may directly purchase the real plasma television.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing advertising in a virtual world will be described. In particular, FIG. 1 illustrates a simplified network architecture 100 for a virtual world. The network architecture 100 shown in FIG. 1 includes a server computer 102, a client device 104, and a computing device 106, all of which are operatively coupled via a network 108. The network 108 may be any suitable network, such as a local area network ("LAN") or the Internet. Although only one client device 104 and one computing device 106 are illustrated in FIG. 1, the network architecture 100 may include multiple client devices and multiple computing devices in any suitable network configuration.

The client device 104 may be any suitable processor-based device, such as a computer or a gaming device. Exemplary gaming devices include the XBOX and the XBOX 360 from MICROSOFT CORPORATION, the WII from NINTENDO COMPANY, LIMITED, and the PLAYSTATION 3 and the PSP from SONY CORPORATION. Although not so illustrated in FIG. 1, the client device 104 may be coupled to any suitable peripheral devices to enable the participant to experience and interact with the virtual world. Exemplary peripheral devices may include an input device, such as a keyboard, a mouse, a microphone, and a game controller, and an output device, such as a display and speakers. Some peripheral devices may even provide both input and output functionality. For example, a game controller may provide vibration feedback.

As shown in FIG. 1, the client device 104 includes a virtual world client module 120, which interacts with the virtual world server module 110 executing on the server computer 102. In particular, the virtual world client module 120 may receive and process data from virtual world server module 110 and output the data to output devices coupled to the client device 104. Further, the virtual world client module 120 may receive data from input devices coupled to the client device 104 and transmit the data to the virtual world server module 110.

The virtual world client module 120 may include any suitable component for accessing the virtual world server module 110. In one example, the virtual world client module 120 may be a computer application configured to locally provide at least a portion of the virtual world for the client device 104. In this way, the amount of data retrieved from the server computer 102 by the client device 104 to generate the virtual world may be reduced. In another example, the virtual world client module 120 may be a web browser configured to retrieve the virtual world from the virtual world server module 110. Since many public computers, such as those found in Internet cafes, commonly have a web browser installed and prohibit the installation of new computer applications, providing participants a way to access the virtual world via the web browser may provide greater accessibility and convenience.

As shown in FIG. 1, the server computer 102 includes a virtual world server module 110 and a cross promotion module 112. The virtual world server module 110 generally administers the virtual world and serves as a conduit between multiple client devices, including the client device 104. The cross promotion module 112 generally enables cross promotion between a real object and a virtual object. The cross promotion module 112 includes a redemption code interface 114, a virtual object database 116, a purchasing interface 118, and a real object database 124, as illustrated in FIG. 1. The redemption code interface 114 may provide an interface with which a participant can enter a redemption code to retrieve a corresponding virtual object. The virtual object database 116 may include virtual objects, which are retrieved by entering the redemption code. The purchasing interface 118 may provide an interface with which a participant can purchase the real world object via the virtual object. The real object database 124 may include information regarding real objects, such as advertising information, purchasing information, and the like. The real object database 124 may further include coupons that can be applied to the purchase of real objects. The operations of the redemption code interface 114, the virtual object database 116, purchasing interface 118, and the real object database 124 are described in greater detail below with respect to FIGS. 2-5.

When a participant desires to access the virtual world, the participant may initiate the virtual world client module 120 to establish a session with the virtual world server module 110 via the network 108. During the session, the virtual world server module 110 may transmit data (e.g., environment layouts, avatar movements of other participants) associated with the virtual world to the virtual world client module 120. Similarly, the virtual world client module 120 may transmit data from associated input devices to the virtual world server module 110. The virtual world client module 120 may further interact with the cross promotion module 112 to cross promote real world objects in the real world and virtual objects in the virtual world. Alternatively, the virtual world server module 110 may act as a conduit between the virtual world client module 120 and the cross promotion module 112 such that virtual world client module 120 and the cross promotion module 112 need not directly communicate.

Figure 2:
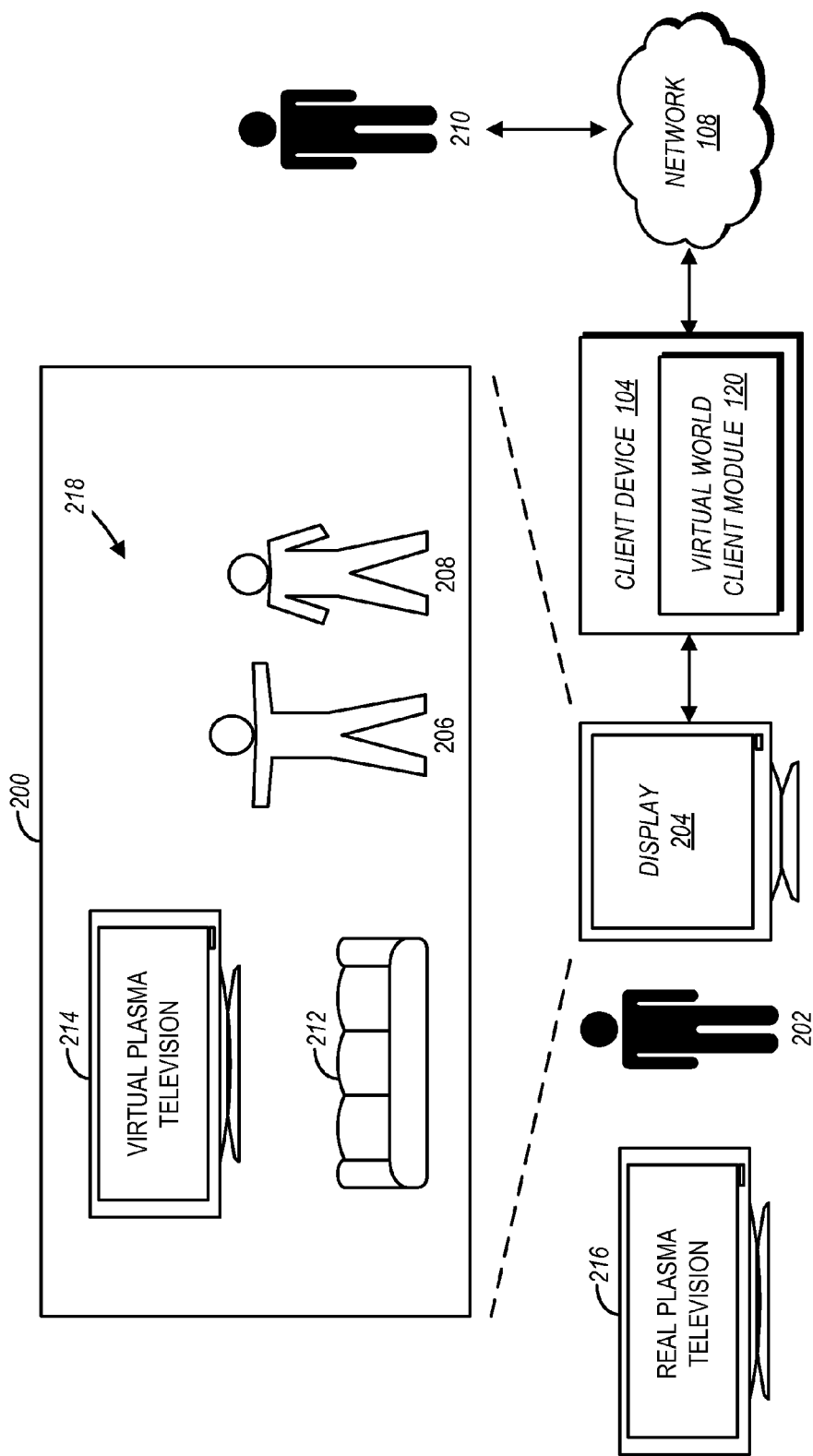
FIG. 2 is a screen display diagram showing an illustrative screenshot of a virtual home within the virtual world, in accordance with one embodiment.

Turning now to FIG. 2, an illustrative screenshot 200 of the virtual world provided by the virtual world server module 110 and the virtual world client module 120 is shown, in accordance with one embodiment. A first participant 202 may view the screenshot 200 on a display 204 operatively coupled to the client device 104. The screenshot 200 illustrates a portion of a virtual home owned by the first participant 202.

As shown in FIG. 2, the screenshot 200 includes a first avatar 206 and a second avatar 208 standing inside a virtual home 218. The first avatar 206 is a fictional representation of the first participant 202 in the virtual world. In one embodiment, the first participant 202 controls the movement of the first avatar 206 within the virtual world via an input device (not shown), such a keyboard, mouse, and game controller, operatively coupled to the client device 104. The first participant 202 may utilize the first avatar 206 to interact with other avatars, such as a second avatar 208, in the virtual world. The second avatar 208 may be the fictional representation of a second participant 210 associated with a second client device (not shown) at a remote location.

As illustrated in the screenshot 200, the virtual home 218 includes a couch 212 and a virtual plasma television 214. In one embodiment, the virtual plasma television 214 is obtained upon the first participant 202 entering a corresponding redemption code. The redemption code may be received upon the first participant 202 purchasing a real plasma television 216 from, for example, a major department store or an online retailer. The store from which the first participant 202 purchased the real plasma television 216 may provide the redemption code in a receipt, via an electronic mail, or by other suitable transmission means. The first participant 202 may then enter the redemption code into a redemption code interface 302, as illustrated in FIG. 3.

Figure 3:
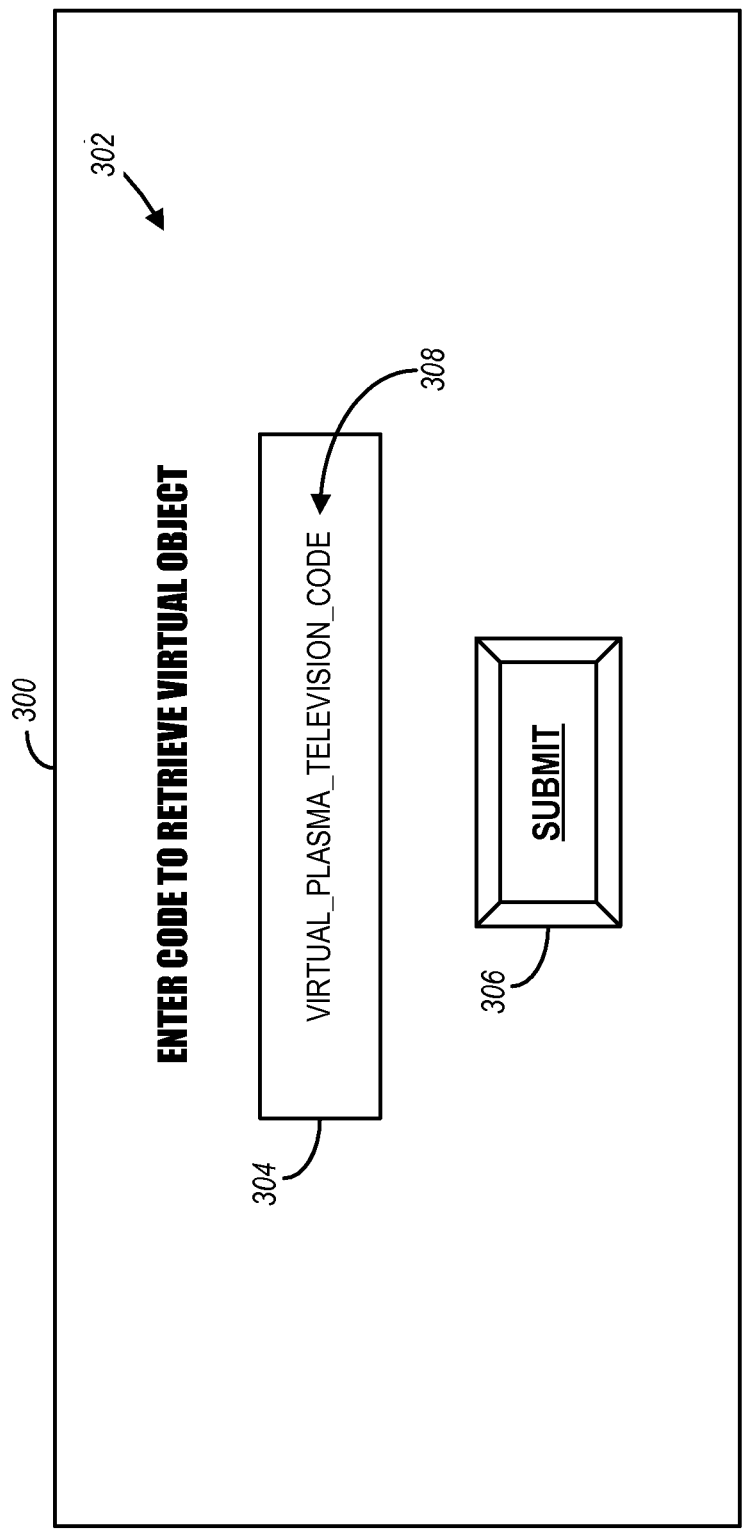
FIG. 3 is a screen display diagram showing an illustrative screenshot of a redemption code interface within the virtual world, in accordance with one embodiment.

Turning now to FIG. 3, an illustrative screenshot 300 of the virtual world provided by the virtual world server module 110 and the virtual world client module 120 is shown, in accordance with one embodiment. The screenshot 300 includes an entry window 304 with which the first participant 202 may enter a redemption code 308. In the example illustrated in FIG. 3, the redemption code 308 is "VIRTUAL_PLASMA_TELEVISON_CODE," which is entered into the entry window 304. Upon entering the redemption code 308, the first participant 202 may click on the submit button 306 to submit the redemption code 308.

Upon receiving the redemption code 308, the cross promotion module 112 may retrieve a virtual object corresponding to the redemption code 308 from the virtual object database 116. In the illustrative example, the virtual plasma television 214 corresponds to the redemption code 308. Accordingly, upon submitting the redemption code 308, the first participant 202 may receive the virtual plasma television 214 from the virtual object database 116. In one embodiment, the virtual plasma television 214 is a virtual replica of the real plasma television 216 purchased by the first participant 202. In another embodiment, the virtual object obtained via the redemption code may be unrelated to the real object purchased to receive redemption code.

Referring again to FIG. 2, the first participant 202 has placed the virtual plasma television 214 in front of the couch 212. Once the virtual plasma television 214 is inside the virtual home 218, other participants may view the virtual plasma television 214 via their corresponding avatars. In the example illustrated in FIG. 2, the first avatar 206, which is controlled by the first participant 202, has invited the second avatar 208, which is controlled by the second participant 210, into the virtual home 218. In one embodiment, the second participant 210 may click on or otherwise interact with the virtual plasma television 214. For example, the second avatar 208 may interact with the virtual plasma television 214. Upon clicking on or otherwise interacting with the virtual plasma television 214, the second participant 210 may be provided with information related to the real plasma television 216 purchased by the first participant 202.

Figure 4:
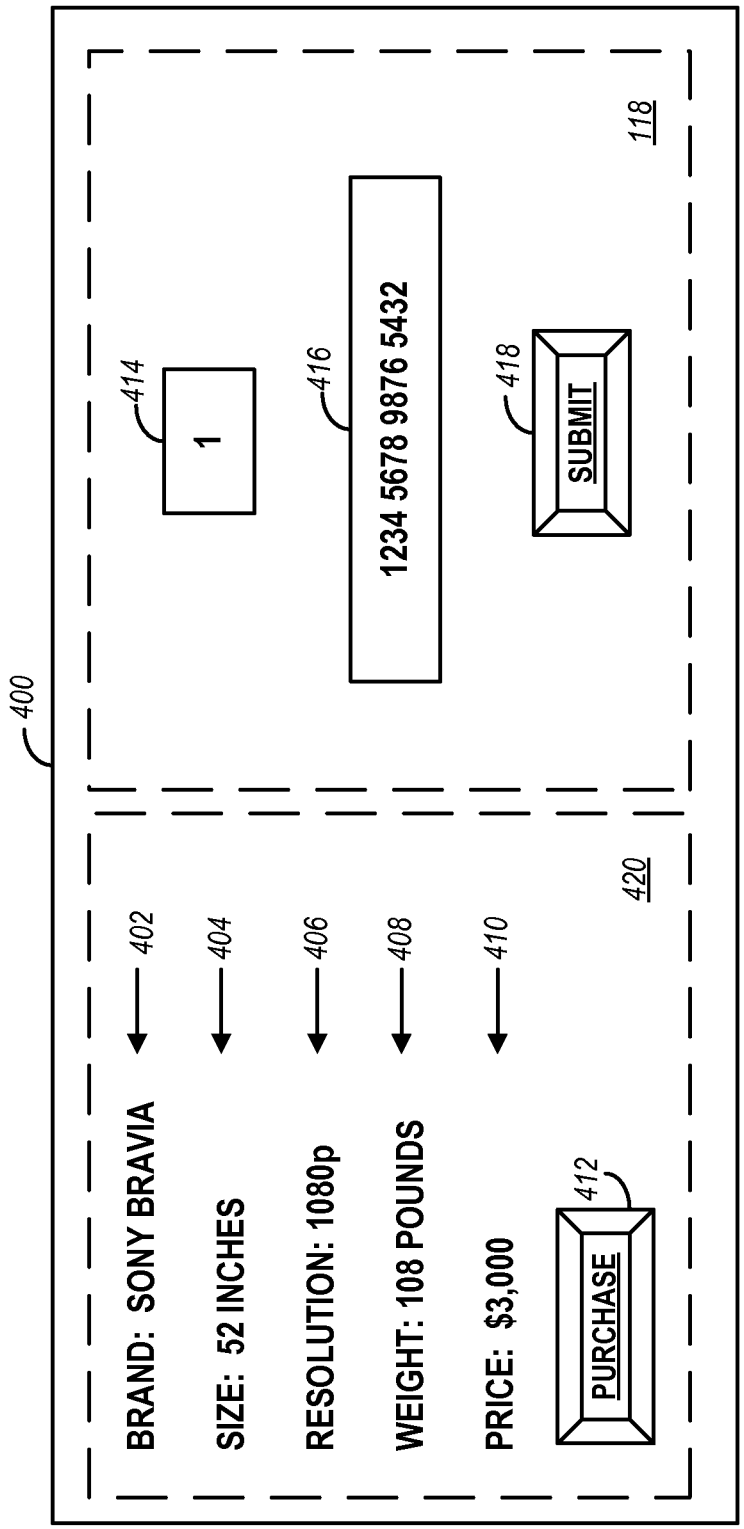
FIG. 4 is a screen display diagram showing an illustrative screenshot of an information window and a purchase interface.

Turning now to FIG. 4, an illustrative screenshot 400 of the virtual world provided by the virtual world server module 110 and the virtual world client module 120 is shown, in accordance with one embodiment. The screenshot 400 includes an advertising window 420 including advertising information 402, 404, 406, 408 and purchasing information 410 regarding the real plasma television 216. In one embodiment, the advertising 402, 404, 406, 408 and the purchasing information 410 are retrieved from the real object database 124. The first advertising information 402 displays the brand name and model associated with the real plasma television 216. The second advertising information 404 displays the diagonal screen size associated with the real plasma television 216. The third advertising information 406 displays the screen resolution associated with the real plasma television 216. The fourth advertising information 408 displays the weight of the real plasma television 216. The purchasing information 410 displays the price of the real plasma television 216.

It should be appreciated that the advertising information 402, 404, 406, 408 and the purchasing information 410 described herein is simplified for ease of illustration. In other embodiments, the advertising information may include any suitable information relevant to advertising or for purchasing the real plasma television 216. Further, the advertising information and the purchasing information may include text, audio, images, video, or combinations thereof.

As illustrated in FIG. 4, the advertising window 420 further includes a purchase button 412. Upon clicking on the purchase button 412, the second participant 210 may view the purchasing interface 118. In another embodiment, the purchase button 412 links to an external website for purchasing the real plasma television 216. The purchasing interface 118 includes a quantity window 414 with which the second participant 210 can enter a quantity of real plasma televisions 216 to purchase. The purchasing interface 118 further includes a credit card window 416 with which the second participant 210 can enter a credit card number to purchase the selected quantity of real plasma televisions 216. The purchasing interface 118 may include other payment options (not shown), such as payment by check or payment via third-party payment service (e.g. PAYPAL). Upon entering the quantity in the quantity window 414 and the credit card number in the credit card window 416, the second participant 210 may click on a submit button 418 to complete the purchase of the selected quantity of real plasma televisions 216.

As shown above with respect to FIGS. 2, 3, and 4, a virtual world participant, such as the first participant 202, may purchase a real object in the real world and receive a redemption code upon purchasing the real object. The first participant 202 may enter the redemption code into a redemption code interface provided within the virtual world. Upon entering the redemption code, the first participant 202 may receive a virtual object corresponding to the redemption code. As the first participant 202 displays and utilizes the virtual object in the virtual world, another participant, such as the second participant 210, may become interested in the virtual object. Upon viewing and interacting with the virtual object, the second participant 210 may receive information, such as advertising information and purchasing information, regarding the real object. The second participant 210 may further receive a purchasing interface with which to purchase the real object.

Figure 5:
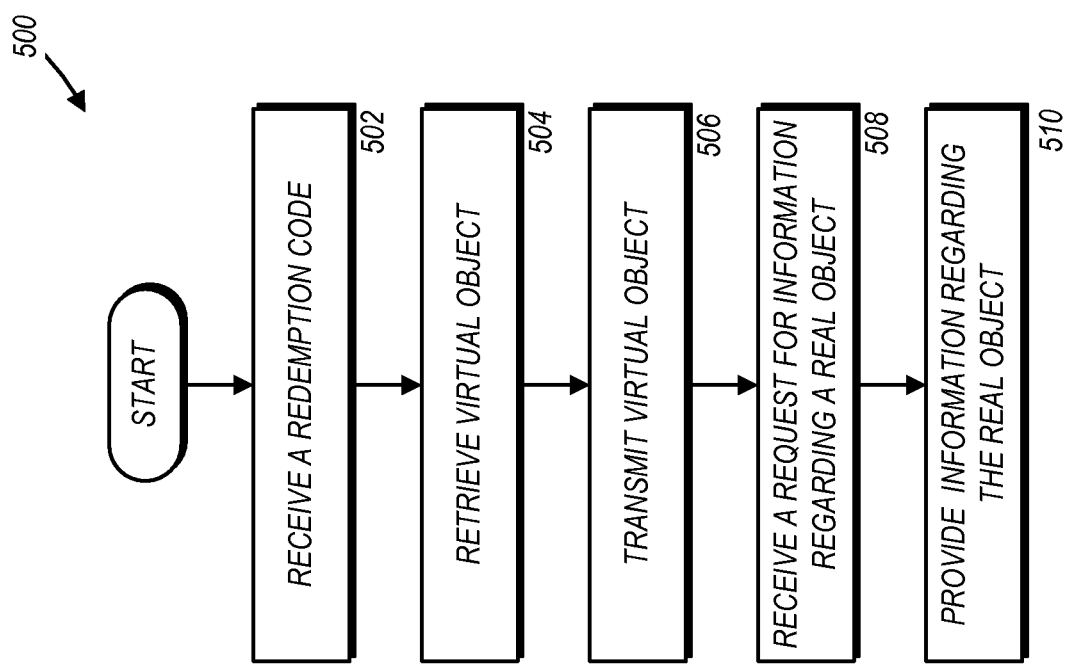
FIG. 5 is a flow diagram showing an illustrative process for cross promoting a real object in a real world and a virtual object in the virtual world, in accordance with one embodiment.

Turning now to FIG. 5, additional details will be provided regarding the cross-promotion of real object and virtual objects. In particular, FIG. 5 is a flow diagram illustrating aspects of one method provided herein for cross-promoting real objects in the real world and virtual objects in the virtual world. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 5, a routine 500 begins at operation 502, where the cross promotion module 112 receives a redemption code, such as the redemption code 308, from a first participant, such as the first participant 202. In one embodiment, the first participant 202 enters the redemption code 308 in a redemption code interface, such as the redemption code interface 114. For example, the redemption code interface 114 may be a selectable option provided by the virtual client module 120.

The first participant 202 may receive the redemption code 308 upon purchasing a real object, such as the real plasma television 216. In one example, the redemption code 308 is included in an insert included in a packaging box along with the real plasma television 216. In a second example, the redemption code 308 is printed on a receipt provided to the first participant 202 upon purchasing the real plasma television 216. In a third example, the redemption code 308 is sent to the first participant 202 via electronic mail upon, for example, completing an online warranty registration. Upon receiving the redemption code, the routine 500 continues to operation 504.

At operation 504, the cross promotion module 112 retrieves a virtual object, such as a virtual plasma television 214, based on the redemption code input in operation 502. In particular, the redemption code may correspond to a particular virtual object in the virtual object database 116. For example, the redemption code 308 (i.e., "VIRTUAL_PLASMA_TELEVISON_CODE") corresponds to the virtual plasma television 214. Upon retrieving the virtual object from the virtual object database 116, the routine 500 continues to operation 506, where the cross promotion module 112 provides the virtual object, such as the virtual plasma television 214, to the first participant 202.

In one embodiment, the first participant 202 and the second participant 210 may utilize and interact with the virtual plasma television 214 via corresponding avatars, such as the first avatar 206 and the second avatar 208, respectively. In one embodiment the virtual plasma television 214 is a replica of the real plasma television 216. For example, the first avatar 206 may operate the virtual plasma television 214 in a similar fashion as the first participant 202 may operate the real plasma television 216. In another embodiment, the virtual object is unrelated to the real object.

The routine 500 continues to operation 508, where the cross promotion module 112 receives a request, via the virtual object, for information regarding the real object. For example, the second participant 210 may click on the virtual plasma television 214 to request the information. At operation 510, upon receiving the request for information, the cross promotion module 112 provides the requested information to the second participant 210. In one embodiment, the requested information is retrieved from the real object database 124. The requested information may include any suitable information, such as advertising information and purchasing information. The advertising information may include specifications regarding the real object. For example, advertising information regarding the real plasma television 216 may include the brand name, the model, the screen size, the dimensions, the resolution, and the weight. The purchasing information may include the price of the real object, information regarding the accessories associated with the real object, shipping information, and warranty information.

The purchasing information may also include an option to directly purchase the real object via the virtual object. For example, the second participant 210 may click on the purchase button 412 to purchase the real plasma television 216. In particular, upon clicking the purchase button 412, the cross promotion module 112 may provide the purchasing interface 118 to the second participant 210. The purchasing interface 118 may provide a number of different options for purchasing the real object.

Figure 6:
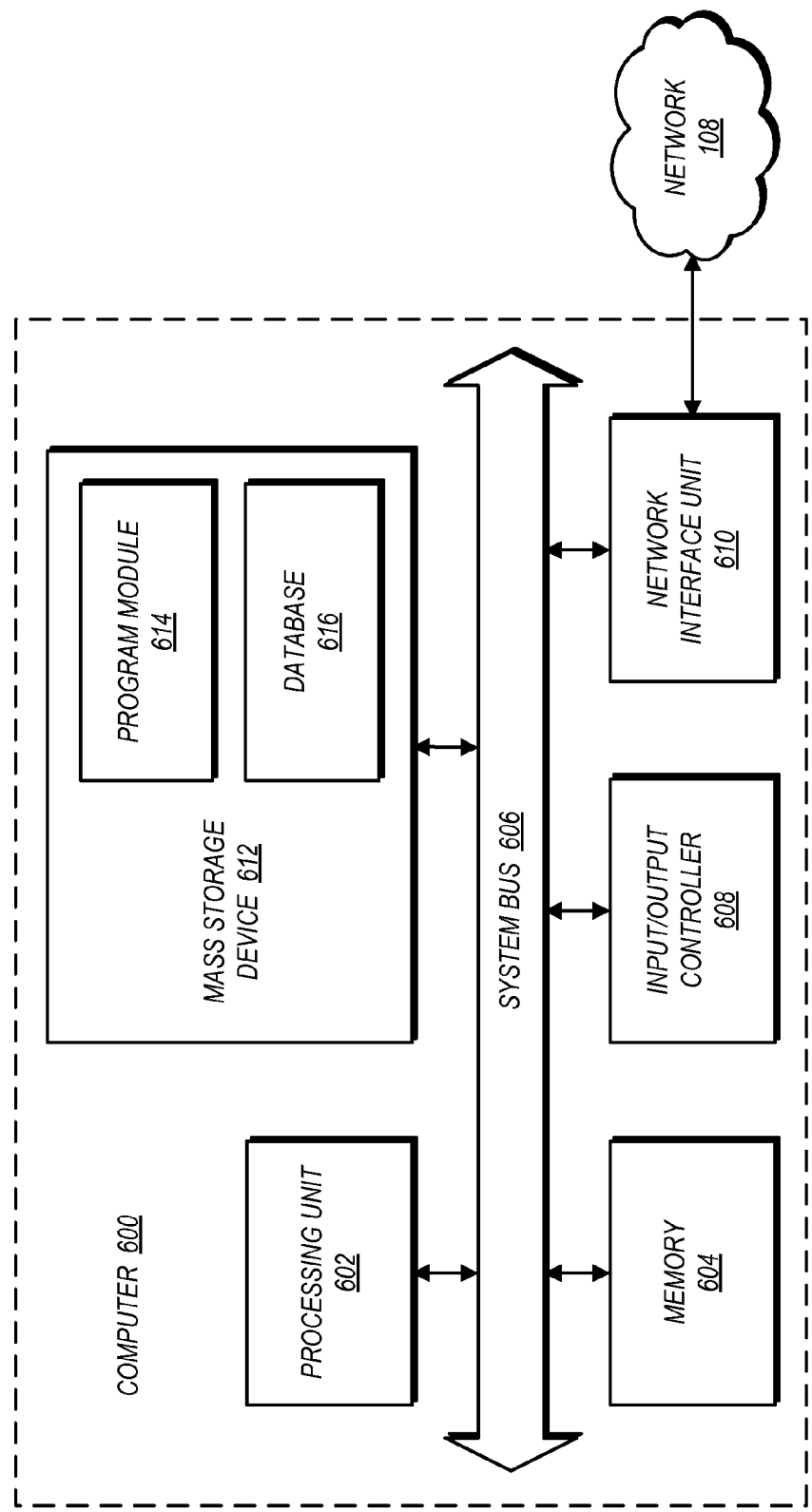
FIG. 6 is a computer architecture diagram showing aspects of an illustrative computer hardware architecture for a computing system capable of implementing the embodiments presented herein.

Referring now to FIG. 6, an exemplary computer architecture diagram showing aspects of a computer 600 is illustrated. Examples of the computer 600 may include the server computer 102, the client device 104, and the computing device 106. The computer 600 includes a processing unit 602 ("CPU"), a system memory 604, and a system bus 606 that couples the memory 604 to the CPU 602. The computer 600 further includes a mass storage device 612 for storing one or more program modules 614 and one or more databases 616. Examples of the program modules 614 may include the cross promotion module 112, the redemption code interface 114, and the purchasing interface 118. Examples of the databases 616 may include the virtual object database 116 and the real object database 124. The mass storage device 612 is connected to the CPU 602 through a mass storage controller (not shown) connected to the bus 606. The mass storage device 612 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 108. The computer 600 may connect to the network 108 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

Based on the foregoing, it should be appreciated that technologies for cross-promoting real objects in the real world and virtual objects in the virtual world are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method of cross-promoting real objects in a real world and virtual objects in a virtual world, the method comprising:
   receiving a notification that a first participant of the virtual world has purchased a real object;
   in response to receiving the notification, providing, to the first participant, a redemption code;
   receiving, from the first participant of the virtual world, the redemption code, wherein the first participant is represented by a first avatar in the virtual world;
   providing, to the first participant, a virtual object that is a virtual replica of the real object purchased by the first participant and corresponding to the redemption code such that the first avatar gains possession and ownership of the virtual object in the virtual world;
   providing, from the first participant to a second participant of the virtual world, access to the virtual object in the virtual world, wherein the second participant is represented by a second avatar in the virtual world, and the second participant accesses the virtual object in the virtual world by utilizing the second avatar to interact with the virtual object in the virtual world;
   upon providing, from the first participant to the second participant, access to the virtual object, receiving, by a computer, from the second participant, a request of information regarding the real object in a real world, the second participant utilizing the second avatar to transmit the request via the virtual object while interacting with the virtual object;
   upon receiving the request via the virtual object, providing, to the second participant and via the virtual object, the information regarding the real object;
   providing, to the second participant and via the virtual object, an interface to purchase the real object via the virtual object;
   receiving, from the second participant and via the interface, payment to purchase the real object; and
   upon receiving the payment, providing the redemption code to the second participant.

2. The method of claim 1, further comprising providing an insert containing the redemption code along with the real object, the insert separate from a packaging of the real object.

3. The method of claim 1, wherein the redemption code comprises a unique identification number corresponding to the virtual object.

4. The method of claim 1, wherein the information regarding the real object comprises advertising information regarding the real object.

5. The method of claim 4, wherein the advertising information comprises specifications regarding the real object.

6. The method of claim 1, wherein the information regarding the real object comprises purchasing information regarding the real object.

7. The method of claim 6, wherein the purchasing information comprises a price to purchase the real object.

8. The method of claim 6, wherein the purchasing information comprises a link to website for purchasing the real object.

9. The method of claim 1, wherein the first participant accesses the virtual world via a first computing device at a first location, and wherein the second participant accesses the virtual world via a second computing device at a second location.

10. A method of cross-promoting real objects in a real world and virtual objects in a virtual world, the method comprising:
   receiving a notification that a first participant of the virtual world has purchased a real object;
   in response to receiving the notification, providing, to the first participant, a redemption code;
   receiving, from the first participant of the virtual world, the redemption code, wherein the first participant is represented by a first avatar in the virtual world;
   providing, to the first participant, a virtual object that is a virtual replica of the real object and corresponding to the redemption code such that the first avatar gains possession and ownership of the virtual object in the virtual world;
   providing, from the first participant to a second participant of the virtual world, access to the virtual object in the virtual world, wherein the second participant is represented by a second avatar in the virtual world, and the second participant accesses the virtual object in the virtual world by utilizing the second avatar to interact with the virtual object in the virtual world;
   upon providing, from the first participant to the second participant, access to the virtual object, receiving, by a computer, from the second participant, a request of information regarding the real object in a real world, the second participant utilizing the second avatar to transmit the request via the virtual object while interacting with the virtual object;
   upon receiving the request via the virtual object, providing, to the second participant and via the virtual object, information regarding the real object and an interface to purchase the real object;
   receiving, from the second participant and via the virtual object, payment for the purchase of the real object; and
   upon receiving the payment, providing the redemption code to the second participant.

11. The method of claim 10, wherein the interface to purchase the real object comprises a credit card interface with which the second participant enters credit card information.

12. An optical disk, a magnetic disk storage device, or a solid state storage device having computer-executable instructions stored thereon which, when executed by a computer, cause the computer to:
   provide a redemption code to a first participant of a virtual world from the purchase of a real object by the first participant, the first participant represented by a first avatar in the virtual world;
   receive, from the first participant, the redemption code;
   retrieve a virtual object that is a virtual replica of the real object and based on the redemption code, wherein the virtual object may be operated in a similar fashion to the real object;
   provide, to the first participant, the virtual object such that the first avatar gains possession and ownership of the virtual object in the virtual world;
   provide, from the first participant to a second participant of the virtual world, access to the virtual object in the virtual world, the second participant represented by a second avatar in the virtual world, the second participant accessing the virtual object in the virtual world by utilizing the second avatar to interact with the at least one operable function of the virtual object in the virtual world;
   upon providing, from the first participant to the second participant, access to the virtual object, receive, from the second participant, a request for information regarding the real object in a real world, the second participant utilizing the second avatar to transmit the request via the virtual object while interacting with the virtual object, the information regarding the real object comprising specifications regarding the real object including a brand name and price of the real object;
   upon receiving the request, providing, to the second participant and via the virtual object, information regarding the real object and an interface to purchase the real object;
   receiving, from the second participant and via the virtual object, payment for the purchase of the real object; and
   upon receiving the payment, providing the redemption code to the second participant.

13. The optical disk, magnetic disk storage device, or solid state storage device of claim 12, wherein the request for information regarding the real object is received from an avatar controlled by the first participant.

* * * * *